July 31, 1956 P. KELLNER 2,756,459
MACHINE FOR FORMING SHEETS OF PLASTIC MATERIAL
Filed March 17, 1954 2 Sheets-Sheet 1

INVENTOR.
PAUL KELLNER
BY
Van Deventer & Shively
ATTORNEYS

July 31, 1956   P. KELLNER   2,756,459
MACHINE FOR FORMING SHEETS OF PLASTIC MATERIAL
Filed March 17, 1954   2 Sheets-Sheet 2
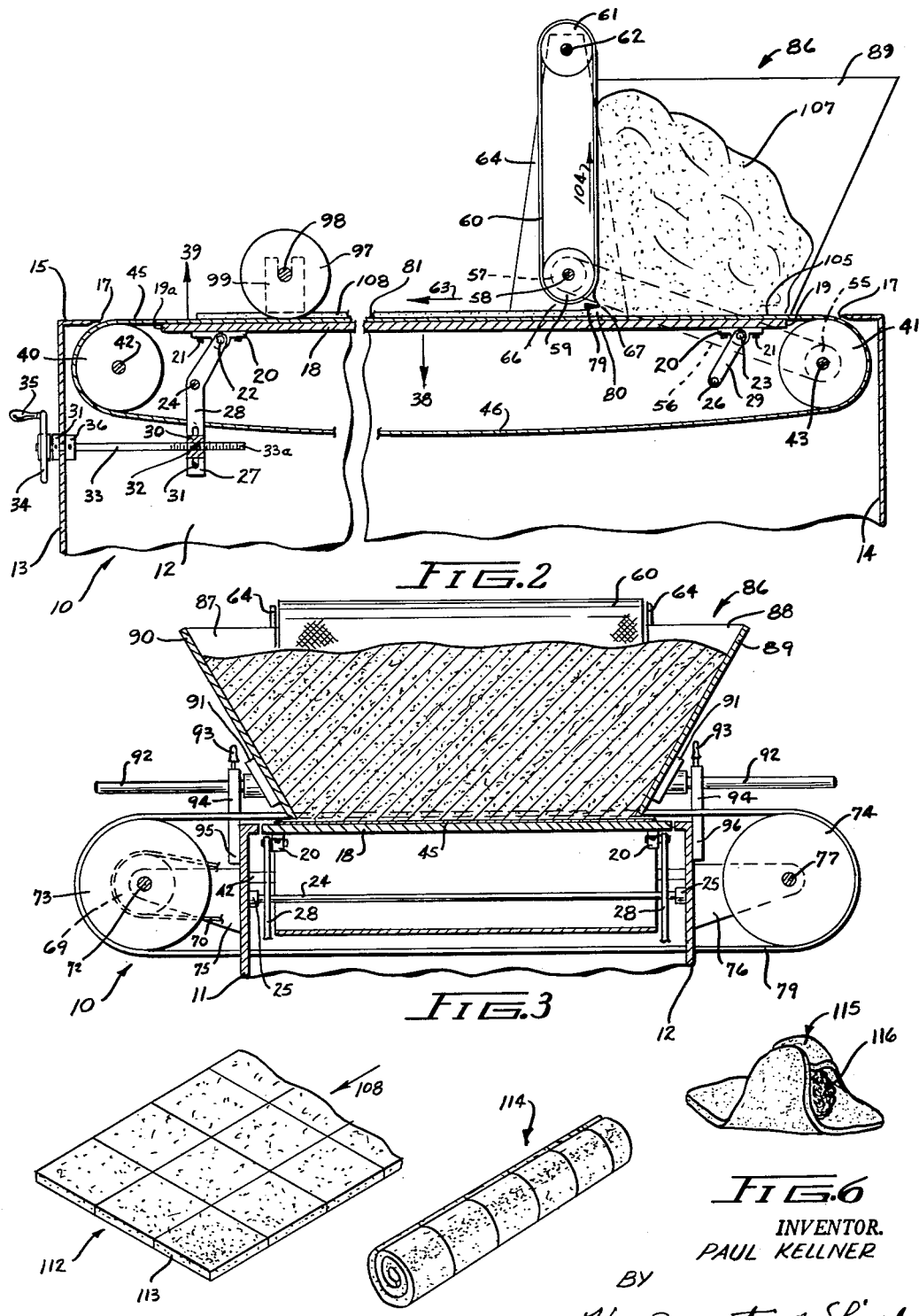
INVENTOR.
PAUL KELLNER
BY
Van Deventer & Shirley
ATTORNEYS

2,756,459

MACHINE FOR FORMING SHEETS OF PLASTIC MATERIAL

Paul Kellner, New York, N. Y.

Application March 17, 1954, Serial No. 416,849

7 Claims. (Cl. 18—15)

This invention relates to a machine for forming sheets of plastic material and has for an object the production of a machine to form sheets of any plastic material such as rubber, cement, plastics, putty, dough or the like.

Another object is to provide a machine of the class described employing a conveyor on which sheets are formed from a body of plastic material, said sheets being continuously formed by a knife operating conjointly with the conveyor to separate the sheet from the body of plastic.

Other objects and advantages will be apparent from a perusal of the following specification where, by way of illustration, is shown a machine for forming sheets of dough. It will be understood that this disclosure is merely illustrative and not limitative, as many changes can be made without, however, departing from the appended claims which define the invention.

In the accompanying drawings:

Fig. 2 is a side view, partly in section, of the machine looking in the direction of the arrows 2, 2, Fig. 1.

Fig. 3 is a cross-sectional view partly in section of the machine, looking in the direction of the arrows 3, 3, Fig. 1.

Figs. 4, 5 and 6 illustrate specimens of products made from sheets of dough produced by the machine shown in the preceding figures, using certain attachments hereinafter described.

Figure 1:
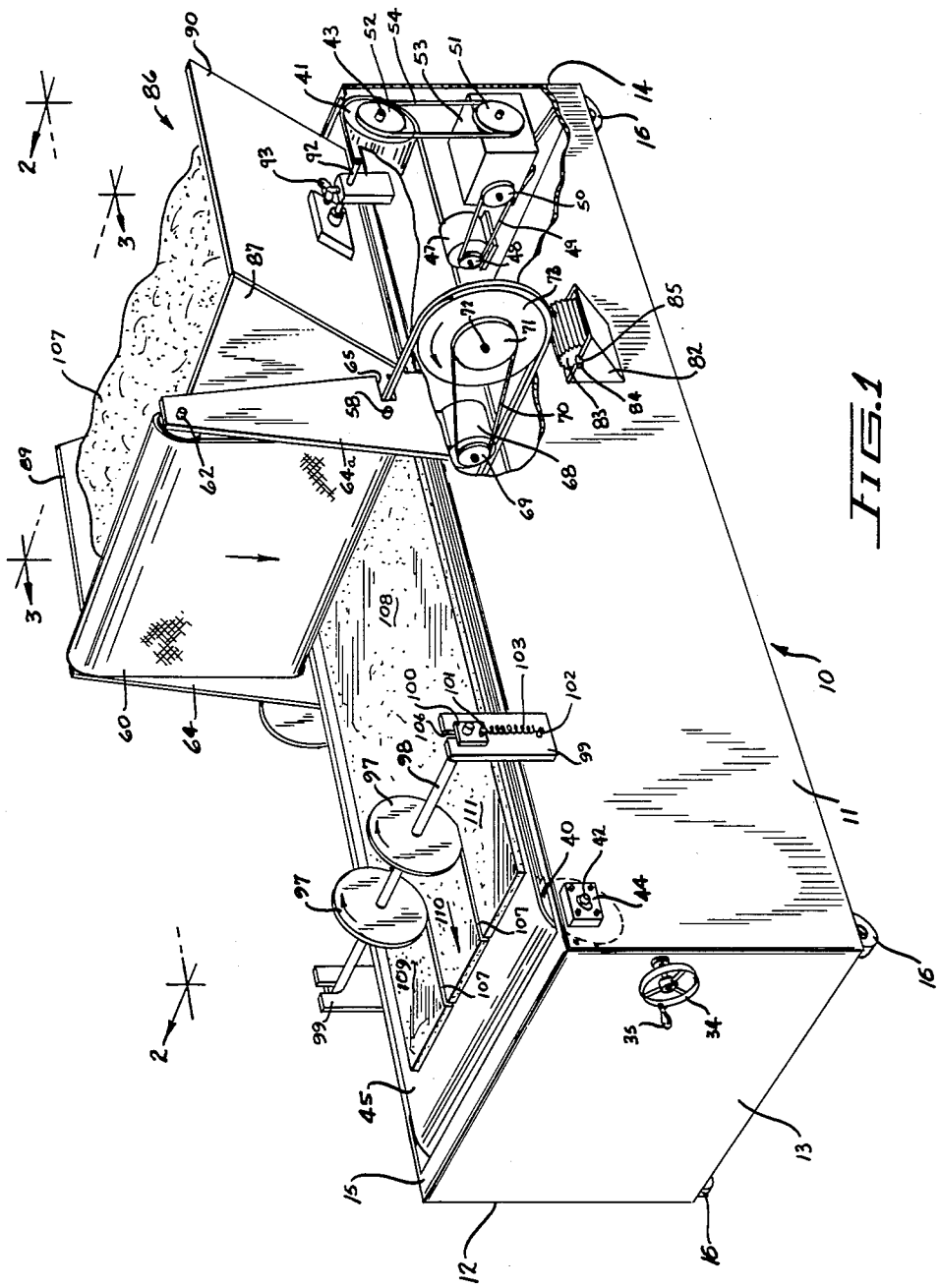
Fig. 1 is a perspective view of a machine embodying the invention.

The numeral 10 denotes the entire machine. This comprises side plates 11 and 12 and end plates 13, 14, secured together in any suitable manner.

The numeral 15 denotes a top plate secured to the upper edges of sides 11 and 12 and ends 13 and 14 and extending around the machine.

Rollers 16 are provided at each end of the machine at the bottom, so that it can be readily moved about as a unit.

There are openings 17 at each end of the machine at the ends of the adjustable platen 18, which extends longitudinally of the machine from the point 19 to the point 19a, and this platen is supported on the plates 20 secured to the underside of the platen in any suitable manner, as by screws 21. The plates 20 carry shafts 22, 23.

Shaft 22 supports two adjustable links 28 supported on rod 24 which extends across the machine as shown in Fig. 3 and is supported on side plates 11 and 12 by supports 25. A similar rod 26 is supported in the same manner as rod 24 and supports one end of links 29, the other end of said links being supported on shaft 23.

The lower end 27 of one of the links 28 has a slot 31 therein to receive the threaded pivot block 30 held in the slot by any suitable means such as pin 32. The block can swivel in the link.

The block 30 is threaded, and engaged by the shaft 33 having its outer end threaded as indicated at 33a. Shaft 33 extends through the end plate 13 and on the outer end is provided with a hand wheel 34 having a handle 35.

Collars 36, 37 hold the shaft in position. Revolving the wheel 34 clockwise will draw the link 28 to the left, Fig. 2. This lowers the platen 18 in the direction of arrow 38. Revolving wheel 34 anti-clockwise will raise the platen in the direction of arrow 39.

Pulleys or rollers 40, 41 are mounted respectively on shafts 42, 43 extending across the machine and these shafts may be supported in bearings on side plates 11, 12 in outside bearings, one of which is shown at 44.

The pulleys 40, 41 support an endless conveyor belt 45 which overlies and is supported on platen 18, said belt having the slack portion 46 therein below the platen.

A motor 47 is connected by any suitable means such as pulley 48, belt 49 and pulley 50 with a suitable speed reducing mechanism 53 which via pulley 51, belt 54 and pulley 52 drives one of the platen pulleys 41 thereby driving the conveyor at a proper predetermined speed which can be varied by adjusting the speed reducing mechanism 53 to drive the platen in the direction of arrow 63, Fig. 2.

A pulley 55 on shaft 43 drives via belt 56 a pulley 57 mounted on shaft 58 carrying a horizontal roller or pulley 59 driving the vertical belt 60 supported at its upper end by the roller or pulley 61 carried on shaft 62.

The shafts 58 and 62 are mounted in the brackets 64, 64a secured to the side members 11, 12 or mounted in any other suitable manner on the machine.

Both supports 64, 64a have slots therein, one of which is shown at 65 to permit the passage therethrough of the knife-belt 79 to be presently described. It will be noted that these slots are positioned below the lower edge 66 of roller 59 and that the cutting edge 67 of the knife 79 is presented to the plastic material being fed to the left Fig. 2. These slots, if desired, can be made to conform to and fit closely upon knife 79 so as to scrape same clean as the knife is drawn through the slots. However, any other suitable means can be used to clean the knife while in motion.

A motor 68 is secured to the framework of the machine and has a pulley 69 driving belt 70 driving pulley 71 on shaft 72 driving pulley 73 supported on a bracket 75 attached to the framework of the machine. The flexible knife-belt 79, preferably of steel, extends around pulley 73 and drives pulley 74 supported on shaft 77 carried by bracket 76 secured to the framework of the machine.

It will be noted that by adjusting the platen 18 by means of wheel 34 as previously described, the space 80 between the edge 67 of knife 79 and the upper side 81 of conveyor belt 45 can be adjusted to provide for forming sheets of plastic material 108 of varying thickness.

It will be noted that said knife 79 is moved at a certain relative speed to the conveyor. This will depend upon the nature of the material being cut.

A lubricant container 82 is secured to side 11 of the machine and carries a roller 83 of suitable form that dips into a suitable lubricant contained in 82 and bearing against the knife 79 lubricates the same so that the knife will not adhere to the plastic material being cut. Roller 83 is removably supported in any suitable manner such as by shaft 84 held in notches 85 in the side walls of the container 82.

An adjustable trough or hopper generally denoted by the numeral 86 is provided having fixed side walls 87, 88 extending inwardly to the inner face of belt 60 facing the hopper.

The side walls 89, 90 of the trough 86 are adjustable transversely of the machine, and each provided with a support 91 secured to a stub shaft 92, and each of said shafts is supported in the bracket 94, where it is held in adjusted position by screws 93. The side brackets 94 are secured to the framework of the machine in any suitable manner at 95, 96. By adjusting the shafts 92 in their supports the width of the bottom or delivery outlet of the hopper can be varied, to vary the width of the sheet 108 as desired.

Thus far a machine has been described that will produce sheets of plastic material, and the operation is as follows—using dough as a typical plastic to be sheeted.

The hopper 86 being filled with dough, motors 47 and 69 are connected to a source of power and begin operation.

The platen 18 is adjusted as previously described to produce a sheet of dough 108 of the desired thickness.

As the vertical belt 60 moves upwardly as indicated by arrow 104 in suitable timed relation to the movement of the conveyor, it continually moves the dough above the edge 67 of knife 79 which is moving transverse the dough, thereby cutting the sheet 108 from the body of the dough, as said body is urged forward, because it is resting at 105 on the upper surface 81 of conveyor 18, which is moving to the left (Fig. 2). As the surplus dough not sheared off from the main body by the knife is carried upwards in the hopper by belt 60, it falls back by gravity when it reaches the top of the belt, returning to the main body of dough in the hopper. As knife 79 moves across the body of dough, it is lubricated by roller 83 as previously described. No dough passes forward above the knife.

The finished sheet 108 of dough is delivered by the conveyor 45 to any desired distance beyond the belt 60. In other words, it is delivered to a point beyond the knife 79 that forms it for further handling, the sheeting process being completed at the knife as above described.

On the free space to the left of belt 60 (Figs. 1 and 2) any desired apparatus can be mounted to further form the dough sheet 108. For example, the circular knives 97 mounted on shaft 98 supported in brackets 99 may be employed to cut the sheet 108 into strips.

The shaft 98 is provided at each end with blocks 100 which overlie the slots 106 in the brackets. The blocks each have a pin 101 to which is connected a spring 103 held under tension by pin 102 in the corresponding bracket. This arrangement, in a manner that will be obvious, holds the knives 97 down on the sheet 108 slitting same as indicated at 107, thus dividing sheet 108 into a plurality of parallel sheets 109, 110, 111.

Instead of forming strips 109, 110, 111 as just described, the sheet 108 may be formed in any desired manner by using any of the known fancy and scoring wheels commonly employed instead of the knives 97. For example, known scoring wheels used instead of the knives 97 will score the dough as shown in Fig. 4 to produce squares 112, 113, which are often rolled up as shown in Fig. 5 to produce the scored rolls 114. Obviously, known fluted rolls can be used to produce pieces of any desired contour such as the tart 115, Fig. 6, adapted to receive a filling 116.

It will be noted that the inventive concept is not in the form of the knives 97 or any other known cutting or forming tool substituted therefor, but in the combination of such tools directly with the dough sheeting machine where the tool is mounted upon and forms part of such machine.

It will also be noted from the foregoing description that the plastic material may be sheeted into sheets of varying thickness without the use of rollers and without compressing the sheet, which occurs when rollers are used. This is a particular advantage when handling dough and the like where it is desired to have the dough in the sheet remain spongy and cellular, that is to say, without being compacted or compressed, and the machine as herein illustrated and described accomplishes this with a minimum of parts.

What is claimed is:

1. In a device of the character described, a conveyor; means for moving said conveyor; a hopper adapted to contain plastic material and to deliver same to said conveyor; means including a motor driven knife adapted to be continuously moved transverse said conveyor and positioned adjacent the surface of said conveyor, said knife having a cutting edge extending in a direction opposite to the motion of said conveyor; means including a vertical belt forming a wall of said hopper and positioned adjacent said knife and adapted to engage surplus material lying thereabout and convey said material away from said knife and upwardly in said hopper whereby the material engaged by said knife and traveling on said conveyor may be separated from material in said hopper and be conveyed in sheet form by said conveyor to a point beyond said knife.

2. The device as claimed in claim 1 wherein said first means comprises a flexible endless knife member; means for supporting said knife; and motor means connected to said last means to move same to move said knife.

3. The device as claimed in claim 1 wherein said first means comprises a flexible endless knife member; and means for applying a lubricant to said member while same is in motion, said means being mounted on said device and including a roller bearing against said knife.

4. The device as claimed in claim 1 wherein said second means comprises an endless belt having a surface extending vertical to said conveyor and substantially at a right angle thereto; means for supporting said belt; and means connected to said last means to move same to move said belt.

5. The device as claimed in claim 1 including a platen underlying said conveyor; and means for adjusting said platen and the conveyor supported thereby whereby the distance between the conveyor and the cutting edge of said knife may be varied.

6. The device as claimed in claim 1 wherein the outlet from said hopper is adjustable whereby the width of said sheet may be varied by adjusting said outlet.

7. In a device of the character described, a conveyor; means for moving said conveyor; a hopper adapted to contain plastic material and to deliver same to said conveyor; means including a motor-driven knife adapted to be continuously moved transverse said conveyor and positioned adjacent the surface thereof, said knife having a cutting edge extending in a direction opposite to the motion of said conveyor; means positioned adjacent said knife and located within said hopper and adapted to engage surplus material lying about said knife and convey said material away from said knife whereby the material lying above and engaged by said knife may be separated from material lying below said knife in said hopper, said last named material being conveyed in sheet form by said conveyor to a point beyond said knife.

References Cited in the file of this patent

UNITED STATES PATENTS

| | | |
|---|---|---|
| 866,354 | Gill | Sept. 17, 1917 |
| 1,350,722 | Goodenbeiger | Aug. 24, 1920 |
| 1,988,901 | Hoefling | Jan. 22, 1935 |
| 2,004,936 | Dorn et al. | June 18, 1935 |
| 2,051,201 | Davidson | Aug. 18, 1936 |
| 2,115,044 | Scott | Apr. 26, 1938 |
| 2,230,074 | Caperton | Jan. 28, 1941 |
| 2,308,034 | Van Derhoef | Jan. 12, 1943 |
| 2,404,582 | Bosomworth | July 23, 1946 |
| 2,635,301 | Schubert et al. | Apr. 21, 1953 |